P. J. SIMMEN.
TRACK HAZARD INDICATOR.
APPLICATION FILED AUG. 2, 1913.

1,241,776.

Patented Oct. 2, 1917.

Attest:
Clarence G. Campbell
Edgeworth Greene

Inventor:
Paul J. Simmen
by William R. Baird
his Atty

UNITED STATES PATENT OFFICE.

PAUL J. SIMMEN, OF INDIANAPOLIS, INDIANA.

TRACK-HAZARD INDICATOR.

1,241,776.   Specification of Letters Patent.   Patented Oct. 2, 1917.

Application filed August 2, 1913. Serial No. 782,693.

*To all whom it may concern:*

Be it known that I, PAUL J. SIMMEN, a citizen of the United States, residing at Indianapolis, in the county of Marion and State of Indiana, have invented certain new and useful Improvements in Track-Hazard Indicators, of which the following is a specification.

This invention relates to the control of moving vehicles, and its novelty consists in the principles governing the operation of the devices employed in the construction of such devices and their adaptation to the peculiar purpose for which they are to be used.

The invention is applicable to all forms of moving vehicles which are under the control of an operator, viz., an engine driver on a locomotive, a motor man on a trolley car or a chauffeur on an automobile, and the purpose of the invention is to guide the operator in the performance of his duties by providing him with an automatic indication of the speed permissible along the line of travel and the hazards which pertain thereto. All vehicles of the class described are provided with a brake or some similar device by which the vehicle can be retarded. My purpose is to indicate the permissible speed so that the brake may be employed by the operator under service conditions within all limits of safety or expediency, but when such conditions are exceeded that such control shall be taken away from the operator and the vehicle sufficiently retarded or stopped altogether so as to prevent disaster. In the accomplishment of the end sought there is provided on the vehicle within the operator's range of vision an actual speed indicator so that he may note what the actual rate of speed of the vehicle is. There is also provided within his range of vision a permissive speed indicator so that he may know at all times what is the maximum speed permitted by the vehicle; and there is further provided what may be called a track hazard indicator by which there is disclosed the different hazards along the right of way which affect or should affect the speed, such as bridges, grade crossings, dangerous curves, yard limits, passages through densely populated districts and the like. This track hazard indicator is provided with means for automatically varying the position of the permissive speed indicator to show the predetermined permissible speed at all of the indicated hazards.

Figure 1:
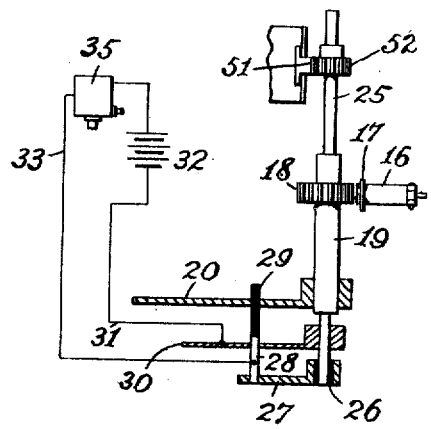
Figure 3:
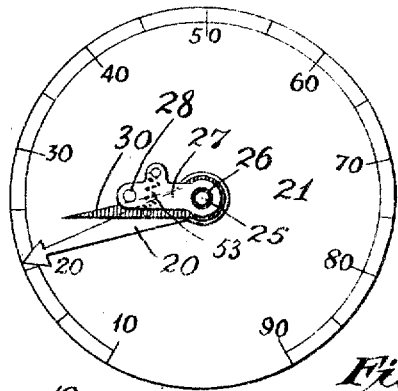
Figure 5:
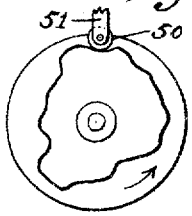
Figure 6:
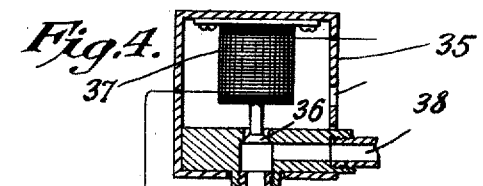
Figure 2:
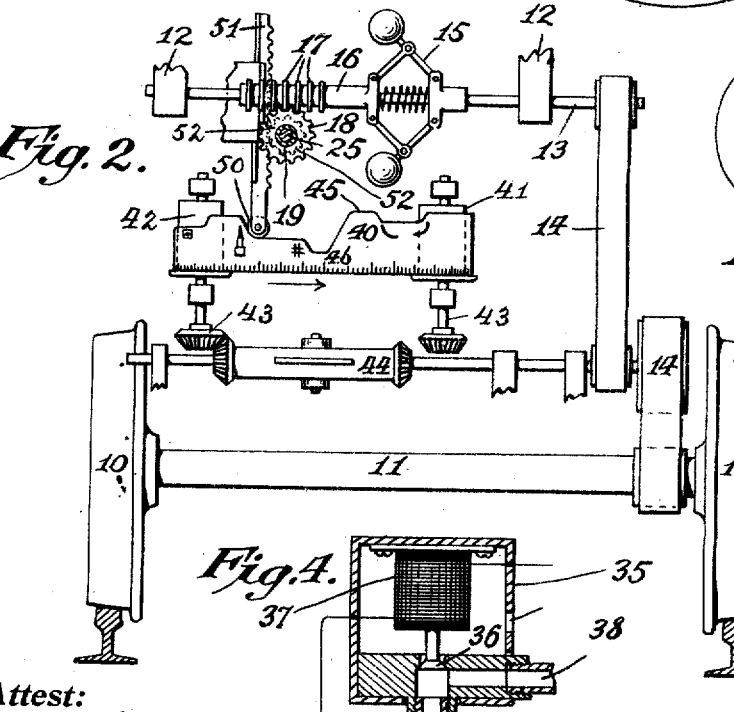
Figure 4:

Enough has been said to disclose the nature of the invention, and a preferred form of its embodiment will now be described, reference being had to the accompanying drawing in which Figure 1 is a plan of a construction embodying the invention; Fig. 2 is a side elevation thereof; Fig. 3 is an enlarged front view of the indicator dial; Fig. 4 is a sectional view of the valve air box; Fig. 5 is a detail of a modified form of the hazard indicator, and Fig. 6 is a similar view of a second modification of the same. The views are all somewhat diagrammatic in character with as much structural detail eliminated as possible in order to simplify the description and to promote a clear understanding of the invention.

In the drawings, 10 indicates the wheels of a vehicle to which the invention is applied, 11 being an axle connecting them. Mounted in suitable bearings 12 at any convenient place on the vehicle is a shaft 13 rotated from the axle 11 by power-transmitting mechanism indicated at 14, and secured on the shaft is an actual speed indicator in the form of a centrifugal governor 15 but which comprises a collar 16 slidable on the shaft 13 and provided externally with annular teeth 17 forming in effect a rack adapted to mesh with a pinion 18 rigidly secured on a hollow shaft 19 on which is rigidly mounted in turn a hand or pointer 20 adapted to be moved in front of a dial 21 graduated circularly in terms of miles per hour or some other suitable notation.

A solid shaft 25 runs through the hollow shaft 19 and is adapted to rotate in bearings on the same center. Rigidly secured to this shaft 25 but insulated therefrom by a bushing 26 is a contactor comprising a radial arm 27 and a laterally projecting bar 28, the end 29 of which is made of insulating material. Loosely mounted on this same shaft is a needle or pointer 30 which may be called the permissive speed indicator pointer and which is moved in front of the dial 21. An electric conductor 31 runs from this pointer to a battery indicated at 32, and a second electric conductor 33 runs to the same battery from the non-insulating portion of the bar 28.

A usual train air pipe 34 passes through a box 35 located at a convenient place on the vehicle and which box contains a valve 36 adapted to open and close the pipe and which is operated by a solenoid 37 mounted in the box, the parts being so arranged that when the solenoid is energized the valve is closed, and when it is deënergized the valve is opened and the air escapes through a port 38 in the box 35 and the brakes are set to retard or stop the vehicle. The construction and mode of operation of an air-brake system of this kind is well understood. The solenoid 37 is in circuit with the battery 32 and conductors 31 and 33.

Arranged at a convenient place within the vehicle and preferably within the range of vision of the operator is what is termed a track-hazard indicator comprising a band 40 of flexible material removably mounted upon and adapted to be wound upon and unwound from a pair of rollers 41 and 42, one of which is moved from a power-transmitting mechanism indicated at 43 receiving its power from the same source and at the same rate as that which transmits power to the actual speed indicator. A suitable clutch indicated at 44 serves to promote the proper engagement of the mechanism and by actuating one or the other of the rollers 41 and 42 to reverse the direction of movement of the band 40.

The upper edge of the band 40 is arranged in profile varying in distance from a maximum at the uppermost level 45 to the lowermost level 46. Along its lowermost edge it is preferably graduated to indicate miles traveled. The depth of the profile is arranged to correspond with the permissive speed of the vehicle at different points along the line of travel, the maximum level corresponding to a maximum speed, the minimum level to minimum speed and the intermediate levels to intermediate speeds. The extent of these levels also indicate the length of the line of travel along which such speeds are permissible. Coupled with the mileage graduations there may be displayed on the band conventional signs representing the nature of the hazards, for instance, a village indicated by an outline of a church, a curve right or left by a heavy curved line, a railroad or other crossing by a cross and other appropriate symbols, so that an operator studying such a band may inform himself in advance of the usual hazards along his contemplated line of travel.

Arranged to contact with the upper or profile edge of the band 40 is a roller 50 at the lower end of a rack bar 51, the teeth of which are adapted to mesh with the teeth of a pinion 52 rigidly mounted on the shaft 25, so that as the rack rises and falls as the band with its profile of variable level passes under and in rolling contact with the trolley 50 the shaft 25 is oscillated and consequently the contactor 27 is oscillated. As the contactor 27 moves to the left or right the permissive speed indicator pointer 30 is moved with it, actual contact promoting such movement to the left and a spring 53 between them securing it to the right.

Now, so long as the actual speed indicator pointer 20 is to the left of the pointer 30, that is, so long as the actual speed of the vehicle is below the permissive speed, nothing happens, but the moment the actual speed exceeds such permissive speed the pointer 20 is brought into contact with the insulated portion 29 of the arm 28 on the contactor 27 and breaks the contact between the conducting portion of such arm and the pointer 30. Consequently, the circuit through the arms 20 and 30, conductors 31 and 33 is broken, the air valve of the brake system is opened, the air escapes and the brakes are automatically applied to retard or stop the vehicle.

That is, if at any time the operator fails to keep his actual speed below the permissive speed, as indicated by the position of the pointer 30, then the vehicle is automatically retarded or stopped. He has control of his speed at all times within legitimate limits, but the control is automatically taken away from him as soon as his speed exceeds the permissible. The extent and duration of the permissive speed is determined by the nature of the profile on the band 40.

It is obvious that variations may be made in the mechanical detail of the device, without departing from the principles of the invention. The precise form of the track-hazard indicator is not material. It may be in the form of a circular disk with the proper profile on its edge and the trolley 50 contacting therewith (see Fig. 5); it may, where the length is to be desired, assume the form of a spiral flange projected from a revoluble cylindrical hub with the profile on the edge of the flange (see Fig. 6); but in whatever form it may be made, it must be capable of being removably secured to the vehicle. The device affords a positive direct control of the speed on a run under operative conditions without any external signal or despatching system. It may be suitably combined with such systems or timing systems also, but these must, of necessity, be outside of the scope of this description. While the invention has been described as particularly applicable to a moving vehicle under the control of an operator, it is very easily conceivable that the apparatus is applicable to moving vehicles which are not under the control of an operator without varying from the principles of the particular invention for controlling the speed.

The track-hazard indicator has also been described as of a form in which the maximum speed indication corresponds with the upper edge of the moving band. Of course it will be understood that this could be reversed and that the minimum speed indication might correspond with such upper edge and the maximum indication with a lower level of the band.

The device which forms the subject-matter of this application has been described all throughout the specification as a track-hazard indicator, and reference has been made to its use with moving vehicles, and impliedly with those which move along a track. It will of course be understood that the invention is equally applicable to a moving vehicle which does not move along a track, and in that case possibly the term of way-hazard indicator would be more appropriate for the particular device in question; but it is thought that no misunderstanding can arise from the use of the word "track" in connection with the device described.

What I claim is:

1. The combination with a vehicle, of variable indicating mechanism carried thereby and continuously controlled by and operating in accordance with the movement of the vehicle along the route for automatically indicating different speeds permissive along said route according to the hazards at the different points, traffic controlling means, and mechanism for automatically effecting the movement of the traffic controlling means when the speed of the vehicle exceeds the indicated permissive speed.

2. The combination with a vehicle, of means carried thereby for automatically indicating at every moment for every point along its line of travel a permissible speed for the vehicle and including vehicle-carried mechanism for automatically varying said permissive speed indication according to the hazards along the route, and means adapted automatically to retard or stop the vehicle if such permissible speed is exceeded.

3. The combination with a vehicle of an actual speed indicator, a permissive speed indicator, a track-hazard indicator and an operative connection between the latter and the permissive speed indicator, and means for automatically retarding the vehicle when its actual speed exceeds its permissive speed as displayed by the track-hazard indicator.

4. The combination with a vehicle of an actual speed indicator, a permissive speed indicator, a track-hazard indicator and operative connection between the latter and the permissive speed indicator, and means for automatically retarding the vehicle when its actual speed exceeds its permissive speed as displayed by the track-hazard indicator, all carried on the vehicle.

5. The combination with a vehicle of an actual speed indicator, a permissive speed indicator, a track-hazard indicator and means operated from the latter automatically to vary the position of the permissive indicator in accordance with the indicated hazards, and means for automatically retarding the vehicle when its actual speed exceeds its permissive speed, as displayed by the track-hazard indicator.

6. The combination with a vehicle of an actual speed indicator, a permissive speed indicator, a track-hazard indicator and operative connection between the latter and the permissive speed indicator, and means for automatically retarding the vehicle when its actual speed exceeds its permissive speed as displayed by the track-hazard indicator, all carried on the vehicle.

7. The combination with the running gear of a vehicle of a device for indicating its actual speed operated from such running gear, a track-hazard indicator indicating the permissible speed of the vehicle at all times, and an operative connection between it and the running gear of the vehicle, a brake system and means brought into operation to actuate it to retard the vehicle when the actual speed indicator and the track-hazard indicator assume predetermined relations.

8. The combination with a vehicle and a brake system therefor, of an actual speed indicator, a permissive speed indicator and a track-hazard indicator, the latter being at the same time a controller for the permissive speed indicator and means whereby whenever the permissive speed indicator and actual speed indicator are in certain predetermined relations the brake sysem is put into operation automatically to retard or stop the vehicle.

9. The combination with a vehicle and a brake system therefor, of an actual speed indicator, a permissive speed indicator and a track-hazard indicator, the latter being at the same time a controller for the permissive speed indicator and means whereby whenever the permissive speed indicator and actual speed indicator are in certain predetermined relations the brake system is put into operation automatically to retard or stop the vehicle, in further combination with a second device adapted to be moved in accordance with the actual speed of the vehicle and which second device is adapted to actuate a second pointer moving over the same dial.

10. The combination with a vehicle, of a track hazard indicator provided with a profile corresponding to the varying speeds permissible along the route, means for moving the indicator proportionately to the extent of travel of the vehicle, and traffic controlling means adapted to be automatically controlled by the variations in the profile of said indicator.

11. The combination with a vehicle, of traffic controlling means, mechanism for actuating said traffic controlling means when the actual speed of the vehicle exceeds a predetermined permissive speed, and means carried by the vehicle for determining said permissive speed at which the actuating mechanism shall become operative and initiating and effecting changes to said permissive speed according to the hazards along the route.

12. The combination with a vehicle, of traffic controlling means, mechanism for actuating said traffic controlling means when the actual speed of the vehicle exceeds a predetermined permissive speed, and means carried by the vehicle for determining said permissive speed at which the actuating mechanism shall become operative and changing it according to the hazards along the route, said determining means including a hazard indicator mounted on the vehicle and means for moving it proportionately to the movement of said vehicle.

13. The combination with a vehicle, of traffic controlling means, mechanism for actuating said traffic controlling means when the actual speed of the vehicle exceeds a predetermined permissive speed, and means mounted on the vehicle and controlled by the movement thereof for automatically determining a plurality of said permissive speeds.

14. The combination with a vehicle, of a traffic controlling means, mechanism for actuating said traffic controlling means when the actual speed of the vehicle exceeds a predetermined permissive speed, and means mounted on the vehicle and controlled by the movement thereof for automatically determining a plurality of successive permissive speeds according to the hazards along the route.

In testimony whereof I affix my signature in presence of two witnesses.

PAUL J. SIMMEN.

Witnesses:
W. L. FISHER,
S. A. PARCHMUT.